Oct. 26, 1954    B. T. HENSGEN    2,692,832
CHEESE CURD MECHANICAL PROCESSING
Filed Feb. 15, 1952
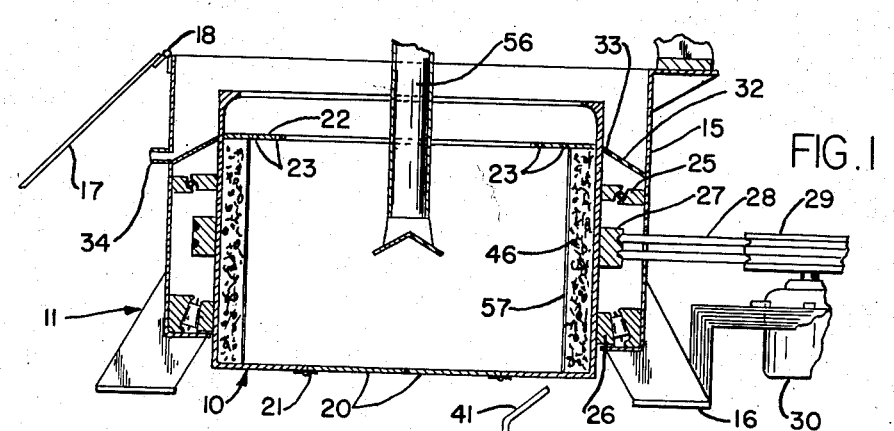
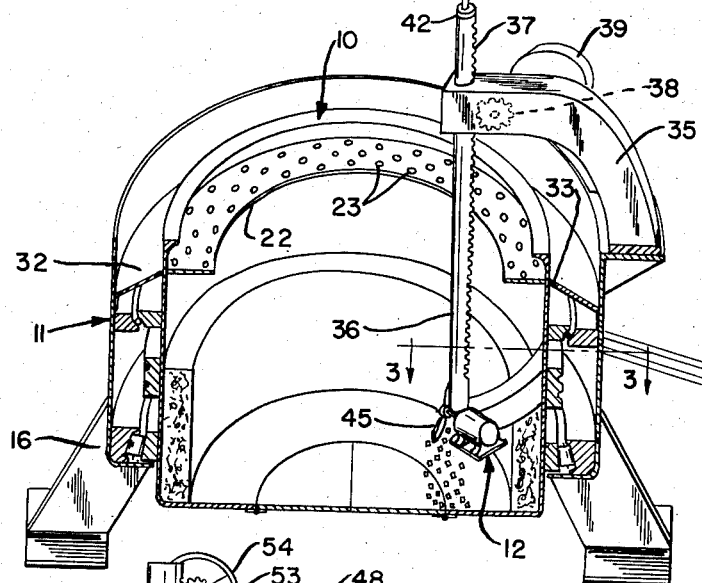
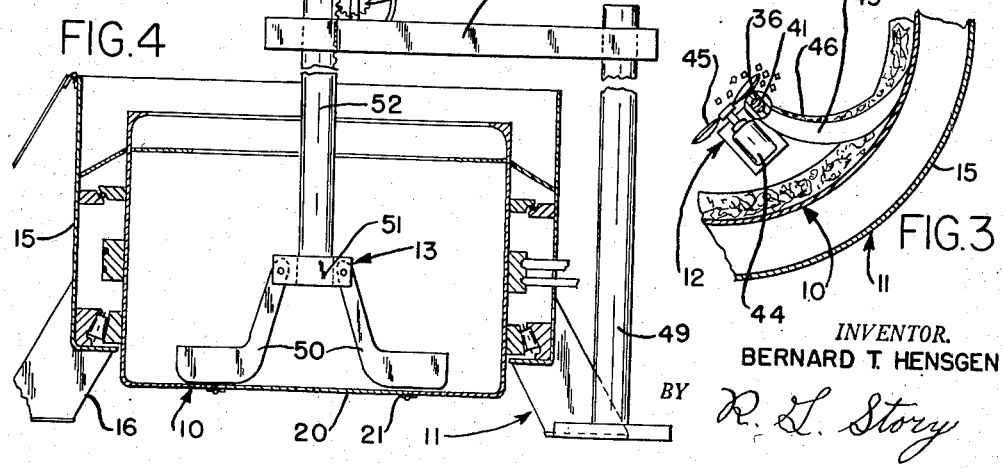
INVENTOR.
BERNARD T. HENSGEN
BY
ATTORNEY Patented Oct. 26, 1954

2,692,832

UNITED STATES PATENT OFFICE 2,692,832

CHEESE CURD MECHANICAL PROCESSING

Bernard T. Hensgen, Chicago, Ill., assignor to Swift & Company, Chicago, Ill., a corporation of Illinois Application February 15, 1952, Serial No. 271,809

6 Claims. (Cl. 99—116)

The present invention relates to a method and apparatus for use in the production of cheese.

The traditional methods of making cheese, which are still used to a great extent, involve numerous separate operations and pieces of equipment to produce a curd ready to be placed in hoops from a coagulated milk. The principal object of the present invention is to simplify operations and to reduce the amount of equipment involved.

A further object is the provision of apparatus to quickly cut the curd into small pieces to increase the drainage of whey therefrom. An advantage of this apparatus is that although the apparatus is speedy in operation the size of the pieces of curd are remarkably uniform. An additional advantage is the ability to easily change the size of the pieces into which the curd is cut to meet the various conditions as they may exist from time to time.

Other objects and advantages will become apparent from the following description taken in conjunction with the drawings in which:

Fig. 1 is an elevation in section of an embodiment of the present invention;

Fig. 2 is a perspective view of the embodiment of Fig. 1 illustrating the curd cutter;

Fig. 3 is a section taken at line 3—3 of Fig. 2; and

Fig. 4 is a view corresponding to Fig. 1 with the curd turning apparatus in operative position.

The illustrated embodiment comprises a centrifuge including a drum, generally 10, rotatively mounted in a frame, generally 11, curd cutting apparatus, generally 12, and cut curd turning apparatus, generally 13.

Frame 11 includes a cylindrical body 15 mounted on legs 16. A cover 17 is secured to the cylindrical body 15 by hinges 18.

Drum 10 is open at the top and also has an opening in the bottom thereof, with the bottom opening being closed by doors 20 attached to the drum by means of hinges 21. Adjacent the upper end of the drum is a circular strainer plate 22 having a plurality of perforations 23 therethrough.

An upper ball bearing 25 and a lower roller bearing 26 support the drum 10 within the frame 11 and allow it to rotate therein. In each case, the inner race of the bearing is secured to the drum 10 while the outer race is secured to the cylindrical body 15. An annular sheave 27 is secured to drum 10 and is driven by belts 28 from a pulley 29 mounted on the shaft of a motor 30.

A baffle 32 is attached to the inner wall of cylindrical body 15 and projects upwardly at an angle to provide drainage. At the upper end, the baffle 32 is provided with a gasket 33 to provide a seal about the rotating drum 10. At one side, a drain fitting 34 is provided to lead the liquid from above the baffle 32 to a suitable receptacle.

A portion of frame 11 forms a support 35 which overhangs the central opening in drum 10. Curd cutting apparatus 12 is mounted from a support 35 and an arm 36 of the curd cutting apparatus 12 passes through a vertical opening in the overhanging end of support 35. The upper end of arm 36 forms a rack 37 which is engaged by a gear 38 rotated by hand wheel 39.

Arm 36 is hollow and within the arm is a rod 41 supported in place by a collar 42 secured to the rod. At the lower end, the rod 41 is attached to and supports a plow 43 as well as a motor 44.

On the shaft of motor 44 is a two-blade cutter 45, the blades of which are at about right angles to the path of the curd 46 across the plow 43 as hereinafter described (see Fig. 3).

A second overhanging support 48 mounted on a post 49 positions the curd turning apparatus 13 in the centrifuge. The curd turning apparatus includes a pair of paddles 50 pivotally mounted in a bracket 51. The bracket in turn is attached to an arm 52 reciprocally mounted in support 48. One side of arm 52 forms a rack which is engaged by a gear 53 turned by hand wheel 54. As the arm 52 is raised from the position shown in 54, the weight of paddles 50 pivots them downwardly to provide clearance for the paddles to be raised through the central opening in strainer plate 22. Conversely when the turning apparatus 13 is lowered into the centrifuge, the paddles 50 contact the bottom of the drum 10 and are pushed outwardly.

In operation, the centrifuge drum 10 is filled with a coagulated curd and whey mixture through means such as a filling spout 56. If desired, the drum 10 may at this time be rotated at a medium speed to hold the curd and whey mixture against the walls of the drum so that whether or not the doors 20 at the bottom of the drum fit tightly, there will be no loss about the doors. After the drum 10 is filled, filling spout 56 is removed and cover 17 is put into place. Rapid rotation of drum 10 presses the curd 46 against the wall of the drum and the whey 57 seeps out through holes 23 in the strainer plate 22 and is collected and drained off through connection 34.

After the major portion of the whey is removed, the speed of the drum 10 is lowered somewhat. The cover is removed and cutting apparatus 12 is lowered into the drum. By pivoting handle 41, the plow 43 is brought into contact with the wall of the rotating drum 10, preferably at a point just below strainer plate 22. The movement of the drum forces the curd out along plow 43, as shown in Fig. 3, and the curd is cut by the rotating blades 45. By turning hand wheel 39, the plow is gradually lowered along the wall of the drum and by the time the bottom of the drum is reached, all of the curd has been removed from the wall and cut into small pieces.

Adjusting the speed of rotation of drum 10 by means of adjusting the speed of motor 30 causes the amount of movement of curd 46 crossing plow 23 to be varied with respect to the rotation of blades 45. The variation will change the length of the piece of curd that is cut off by each movement of the blades of the cutter. The amount of movement of hand wheel 39 may also be used to control the size of the pieces into which the curd is cut. By lowering the cutting apparatus 12 very slowly, only a thin slice of curd is picked off the wall at any one time and thus the resulting pieces into which the curd is cut are quite small. By lowering cutting apparatus 12 at a faster rate of speed, with respect to the speed of rotation of the drum, the size of the pieces may be increased.

After the curd has been cut, the plow 43 is disengaged from the wall of the drum 10 by rotating handle 41 and the cutting apparatus 12 is removed from the drum. Subsequently, the curd turning apparatus 13 is lowered into the drum and by a slow rotation of the drum the curd is continually turned therein. During the working of the curd, the curd may be salted. When the cheddaring of the curd is completed, the doors 20 are opened and the curd removed to be packed into hoops in the usual manner.

The foregoing description of a specific embodiment is for the purpose of complying with 35 U. S. C 112 and should not be construed as imposing any unnecessary limitations upon the appended claims.

I claim:

1. A device for use in the manufacture of cheese including a centrifuge to separate the whey from the curd, with the whey being discharged from the centrifuge and the curd being retained therein, a plow, mounting means for said plow to support the plow in the centrifuge in a position to lift the curd from the rotating wall of the centrifuge, and cutting means associated with said plow in said centrifuge to cut the curd leaving the plow.

2. A device for use in the manufacture of cheese including a centrifuge to separate the whey from the curd, with the whey being discharged from the centrifuge and the curd being retained therein, a plow to lift the curd from the rotating wall of the centrifuge, and a bladed, power-driven rotary cutter intersecting the path of the curd from said plow to cut the curd leaving the plow.

3. A device for use in the manufacture of cheese from the curd in a coagulated milk product, said device including a frame, a power-driven drum mounted on said frame for rotation about an axis, means to retain the curd in the rotating drum while allowing the whey to escape, a plow, mounting means for said plow and said mounting means being attached to said frame and including an arm having the plow attached to one end thereof, said arm being moveable parallel to said axis to move the plow along the wall of said drum, and a bladed, power-driven rotary cutter intersecting the path of the curd leaving the plow.

4. A device for use in the manufacture of cheese including a frame, a power-driven drum mounted on said frame for rotation about a substantially vertical axis, a portion of said frame overhanging said drum, an arm mounted in said portion for movement parallel to said axis, said arm having a rack thereon, a plow pivotally mounted on the lower end of the arm to contact the wall of the drum to move material from the wall inwardly along a given path, gear means on said frame and engaging said rack to move said plow along the wall of the drum from one end to the other thereof, a bladed cutter rotatively mounted on the end of said arm, with said blades intersecting said path, and power means to rotate said cutter.

5. A device for use in the manufacture of cheese including a frame, a driven drum mounted in said frame for rotation about a substantially vertical axis, variable speed power means to rotate said drum, said drum having an open top and a hinged bottom, means to permit removal of the whey from the drum as it is separated from the curd by centrifugal force, curd breaking means to separate the curd from the wall of the drum and to cut the curd into small pieces, and a paddle means to turn the broken curd in the bottom of the drum.

6. The method of operating a centrifuge in the manufacture of cheese including the steps of centrifugally separating the whey from the curd, removing the whey from the centrifuge, scraping the curd from the wall of the centrifuge and cutting the curd into small pieces as it is removed from the wall, stirring the curd, and removing the curd from the centrifuge.

References Cited in the file of this patent

UNITED STATES PATENTS

| Number | Name | Date |
| --- | --- | --- |
| 1,105,444 | Lougher | July 28, 1914 |
| 1,475,398 | Kielsmeier | Nov. 27, 1923 |
| 2,387,276 | Link | Oct. 23, 1945 |
| 2,544,672 | Greer et al. | Mar. 13, 1951 |
| 2,574,508 | Strezynski | Nov. 13, 1951 |